United States Patent [19]

Kamamori et al.

[11] Patent Number: 4,999,094

[45] Date of Patent: Mar. 12, 1991

[54] METHOD FOR MANUFACTURING A COLOR MEMBER

[75] Inventors: Hitoshi Kamamori; Koji Iwasa; Mitsuru Suginoya; Yutaka Sano; Yumiko Terada; Naoki Kato, all of Tokyo, Japan

[73] Assignee: Seiko Instruments & Electronics Ltd., Japan

[21] Appl. No.: 706,401

[22] Filed: Feb. 28, 1985

[30] Foreign Application Priority Data

Feb. 28, 1984 [JP] Japan .................... 59-36785

[51] Int. Cl.$^5$ .................... C25D 13/06; C25D 13/12
[52] U.S. Cl. .................... 204/180.2; 204/180.9; 204/181.1; 204/181.6; 204/181.7
[58] Field of Search ............ 204/18.1, 20, 30, 35.1, 204/37.6, 38.4, 38.7, 40, 180.2, 181.1, 181.5, 181.7, 180.9, 181.6; 428/432, 461

[56] References Cited

U.S. PATENT DOCUMENTS

| 3,681,222 | 8/1972 | Gupton, Jr. .................... 204/181.5 |
| 4,130,472 | 12/1978 | Kaplan et al. .................... 204/181.5 |
| 4,522,691 | 6/1985 | Suginoya et al. ................ 204/181.7 |

FOREIGN PATENT DOCUMENTS

| 2940789 | 4/1981 | Fed. Rep. of Germany . |
| 53-118363 | 10/1978 | Japan .................... 204/181.5 |
| 54-16972 | 2/1979 | Japan .................... 204/181.1 |
| 2009991 | 6/1979 | United Kingdom . |

OTHER PUBLICATIONS

Kirk-Othmer Encylcopedia of Chemical Technology, 3rd Ed., 1982, vol. 20, pp. 634–645.
Japan Display '83, Oct. 4, 1983, pp. 206–209, Tokyo, Japan, M. Suginoya et al., "Multicolor Graphic LCD with Tri-Colored Layers Formed by Electrodeposition".

*Primary Examiner*—T. Tung
*Assistant Examiner*—Ben C. Hsing
*Attorney, Agent, or Firm*—Bruce L. Adams; Van C. Wilks

[57] ABSTRACT

A method for manufacturing a color member, e.g., a color filter for a display device. A conductive thin film layer having given plural patterns is formed on an electrically insulative substrate. On the conductive thin film layer, a colored layer is formed by electrodepositing a coloring material and polymer on the conductive layer. The substrate having the colored layer thereon is cut to produce plural color members.

25 Claims, 2 Drawing Sheets

METHOD FOR MANUFACTURING A COLOR MEMBER

BACKGROUND OF THE INVENTION

This invention relates generally to a color member and more particularly, the present invention relates to a more practical method of manufacturing devices for which a high accuracy, a high degree of miniaturization, and color surface are requisite, such as a display element, a color filter of a camera tube, or a colored scale of a microscope, and provides a method of manufacturing a color member which has color layers consisting of polymers formed by electrodeposition.

The most convenient method of producing a color member is by printing. However, printing has the problems that precise alignment during multicolor printing is difficult, and a high accuracy and a fine pattern can not be realized. A color filter with high accuracy and a very fine pattern, for use in a camera tube or the like, is therefore produced by photolithography. Although photolithography provides a sufficiently high accuracy and fineness, a separate photolithographic process must be conducted for each color, and this makes the manufacture extremely complicated. In addition, there is a limit to the size of the substrate that can be handled, due to limits imposed on devices such as an aligner.

As a simple method of producing a multicolor surface member with a high level of accuracy, the applicant of this invention has previously proposed U.S. Pat. No. 4,522,691 a method of manufacturing a multicolor pattern comprising forming a conductive layer on a substrate, and then depositing a polymer and a pigment using the conductive layer as an electrode to form a color layer.

SUMMARY OF THE INVENTION

One object of the present invention is to provide a new method of manufacturing a multicolor member by electrodeposition.

Another object of the present invention is to provide a method of manufacturing which increases the productivity of the multicolor member and decreases the manufacturing cost.

A further object of the present invention is to provide a method of manufacturing which makes it possible to produce a plurality of colored members simultaneously on the same substrate.

DETAILED DESCRIPTION OF THE INVENTION

Figure 1:
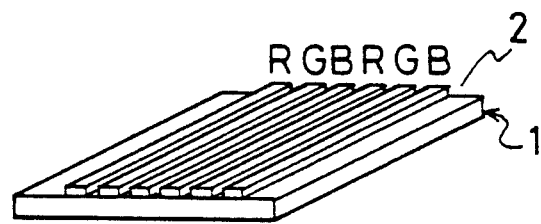
FIG. 1 is a perspective view showing an embodiment of the present invention.

Hereinafter a method of forming a color layer by the electrodeposition of a polymer, which is an essential feature of the present invention, will be described. One means of electrodepositing a polymer on an electrode is a method in which a monomer is electrochemically polymerized on the electrode. As an example of such a method, it is reported that various vinyl compounds can be electrochemically polymerized on an iron sheet to obtain polymer films ("Metal Surface Technique", Vol. 19, No. 12, 1968). Intensive studies are now being made into electrochemically polymerizing pyrrole, thiophene or the like to form conductive polymers such as polypyrrole, polythienylene or the like on an electrode. However, this method of directly electrochemically polymerizing a polymer is not very efficient, and has the problem that the color thereof can not be selected as required. Another method of electrodepositing a polymer onto an electrode is one in which a polymer is made insoluble so that it precipitates onto a electrode from a polymer solution. A method called "electrodeposition coating", in which a pigment is dispersed in an aqueous polymer solution, a metal piece is immersed in the solution to act as an electrode, and a color layer is electrodeposited on the metal, is industrially known, and is used for precoating of automobile bodies or the like.

The principle of this method is that a hydrophilic group such as a carboxyl group is introduced into a polymer, and it is then neutralized and made water-soluble by the use of an inorganic alkali, organic amine, or the like. The electrode is immersed in the aqueous solution of the polymer which is thus made water-soluble, and when a voltage is applied thereto, carboxyl anions that dissociate in the aqueous solution produce electrophoresis towards the anode and react with the protons generated by the electrolysis of water on the electrode, making the polymer insoluble and precipitating it. In other words, the reaction expressed by the formula below takes place at the anode, and the polymer is observed to precipitate thereat:

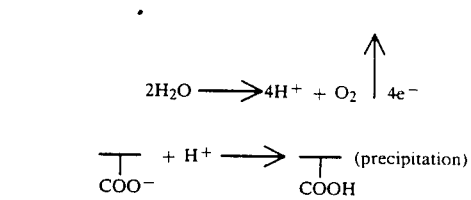

If a basic group (e.g. a polyamine) is used as the hydrophilic group and the polymer is neutralized and made water-soluble, the precipitation of the polymer can be observed on the cathode instead.

If the polymer thus electrodeposited has an insulating property, it is believed that as the electrode is covered with the polymer, the current decreases gradually and prevents the electrode from being coated further, and no increase in film thickness can be expected. In practice, however, complete coating of the electrode in the initial stages is prevented by bubbles of nascent oxygen, and a certain film thickness can be obtained before the insulating layer is formed. In general, a film of between 10 to 20 μm thick is obtained by electrodeposition with the application of 100 to 200V, but when a multicolor surface member with a high accuracy and a very fine pattern is desired, the pattern spacing is only a few μm, so that fusion will occur between the lines of the pattern if the film is too thick. For this reason, the thinner the film, the better. In general, a preferred thickness is about 1 μm. To obtain this thickness, it is necessary to set the resin concentration, the voltage, and the solvent composition to optimum values. The polymer film obtained in this manner has a low moisture content due to the effect of electric permeation, and is a uniform film with higher adhesion than a film obtained by coating or the like.

Since the coloring method disperses pigment in an aqueous polymer solution, the charged pigment produces electrophoresis together with the polymer and is taken into the film, and a color layer can be formed on the electrode.

Accordingly, if a conductive film is patterned as required by vacuum evaporation using a mask, sputtering or etching, the polymer and the pigment can be selectively electrodeposited onto the conductive portions to which a voltage is applied, and a color layer devoid of any displacement from the desired pattern position can be formed. Multicolor layers can be formed easily by repeating this process, because no color layer is formed on the portions on which electrodeposition has already been applied.

The present invention utilizes the property of this method of producing a multicolor surface member by electrodeposition in that it can provide an extremely uniform color layer, irrespective of the size of the substrate. In other words, after conductive layers of a plurality, of patterns are formed on the substrate and color layers are simultaneously formed by electrodeposition, the substrate is cut out according to each pattern, so that a method of manufacturing a multicolor surface member which has an extremely high producibility and low manufacturing cost can be obtained.

Hereinafter, the present invention will be described in detail with reference to several embodiments thereof.

(Embodiment 1)

A transmissive multicolor surface member provided with a stripe pattern 2 consisting of a sequence of 200 μm wide red (R), green (G) and blue (B) lines, as shown in FIG. 1, was manufactured.

The manufacturing method will be described in detail below.

(1) Patterning Process

Figure 2:
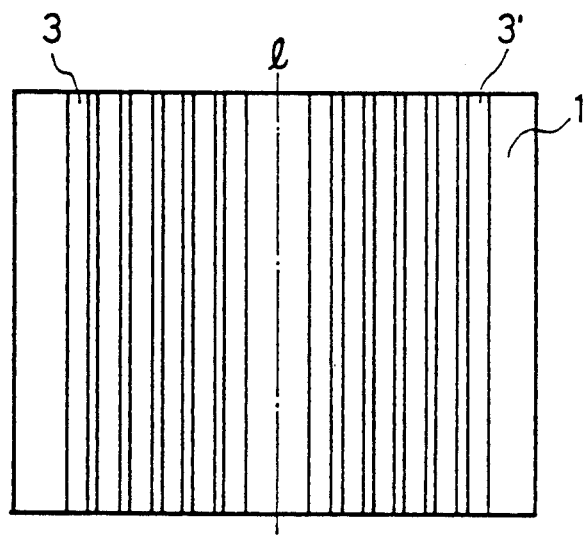
FIG. 2 is a schematic plan view showing an embodiment of the present invention.

Reference numeral 1 FIG. 2 denotes a transparent substrate made of glass, having a size twice that of the substrate 1 of the desired multicolor surface member shown in FIG. 1 A transparent, conductive tin oxide film was formed on the transparent substrate by, spray coating, and the film was then etched in the form of lines 3, 3' having a width of 200 um, to form two similar stripe patterns 2, 2' as shown in FIG. 2.

(2) Electrodeposition Process

An electrodeposition bath of the following composition was prepared using a paint ("S-Via ED-3000", a product of Jinto Paint K.K.) of the following composition:

S-Via ED-3000

| Water-soluble polyester resin | |
|---|---|
| Water-soluble melamine resin | } 70% by weight |
| Butyl Cellosolve | |
| Ethyl Cellosolve | } 30% by weight |
| n-Butanol | |

Electrodeposition bath:

| Material | Weight ratio |
|---|---|
| S-Via ED-3000 | 8 |
| Water | 120 |
| Methyl Cellosolvent | 12 |
| Dye | x |

The dyes used were limited to those which were soluble in methyl Cellosolve used as a hydrophilic solvent, and the upper limit of the dye weight ratio x was determined by the solubility of the dye. In other words, in order to obtain a high coloring density, it is necessary that x is large and the solubility of the dye in methyl Cellosolve is also large. Preferred dyes are oil colors of a metal complex salt structure soluble in the hydrophilic solvent. The dyes have a high solubility in the hydrophilic solvent and an extremely high light fastness. (Examples include those with trademarks like Aizen Spilon, Oleosol Fast, Neo Zapon, Valifast, etc.). A typical example thereof has the following molecular structure.

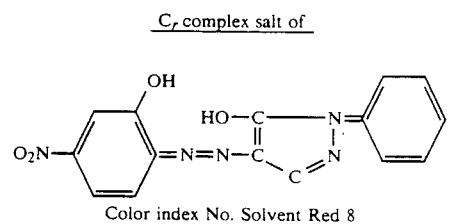

Color index No. Solvent Red 8

The bath was prepared in the following manner. First the S-Via ED-3000 was dissolved in water, the methyl Cellosolve in which the dye was dissolved was added to the aqueous solution, and the dye was uniformly dispersed therein. The methyl Cellosolve functioned as a dispersion medium in this case. If the quantity thereof added was too much or if there were too many carbon atoms of the alkyl group of the Cellosolve, however, the film would become too thick and non-uniform.

Figure 4:
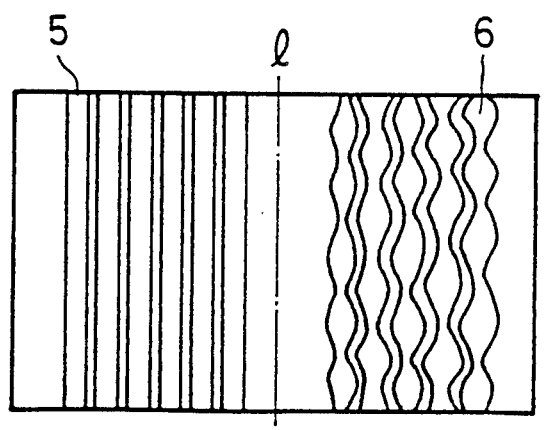
FIGS. 4, 5 and 6 are schematic plan views of other embodiments of the present invention, respectively.

The transparent substrate 1 on which the transparent conductive films 3, 3' were formed was then immersed in the electrodeposition bath prepared in the manner described above. The parts of the transparent conductive films 3, 3' patterned in the stripe form which were to form electrodes of the same color were selected, and a voltage of between 10 to 40V was applied for three minutes between the selected electrodes as the anode and an opposite electrode. In this case, a large current flowed immediately after the application of power, but it decreased gradually and approached zero. After the application of power, the transparent substrate 1 was removed and was then washed with water. Any solution adhering to the portions to which the voltage was not applied was washed off. After washing with water, the substrate was dried, leaving a color 4 layer with a high degree of transparency formed on the electrodes 3, 3' to which the voltage had been applied as shown in FIG. 4.

(3) Curing Process

Next, the polyester resin and melamine resin in the color layer formed by the electrodeposition were subjected to a polycondensation reaction and were cured by baking. Baking was effected at 175° C. for 30 minutes in air to sufficiently cure the resins. In order to further improve the fastness of the color layer, however, the baking time can be extended or the baking can be done at a reduced pressure. After curing, the color layer film was 1.5 μm thick.

Figure 3:
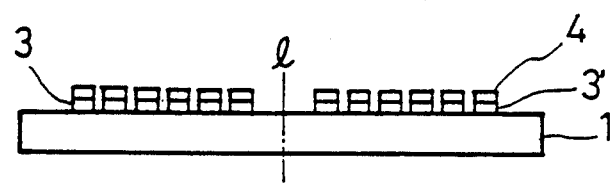
FIG. 3 is a schematic sectional view showing an embodiment of the present invention.

The cured color layer was an efficient insulating layer and was not electrodeposited or dyed again, even when reimmersed in the electrodeposition bath. When the second and subsequent layers were formed, therefore, the transparent electrodes which were to be colored another color were selected, and the electrodeposition and curing were repeated in an electrodeposition bath of a different color (see FIG. 3).

(4) Cutting Process

After the color layers 4 were formed, the transparent substrate 1 was cut along the line 1 of FIG. 2 into two sections both having the same pattern.

The production steps described above provided two identical multicolor surface members by a single electrodeposition step. When four or nine members were produced on the same substrate by the same steps, four or nine identical multicolor surface members could be obtained, respectively.

(Embodiment 2)

Transparent conductive films 5 and 6 of mutually different patterns were formed on a transparent substrate, as shown in FIG. 4 and two different multicolor surface members were simultaneously produced in the same way as in Embodiment 1. In this case, two different multicolor surface members with uniform color layers through different patterns could be obtained in the same way as in Embodiment 1 in which colored members of the same patterns were produced.

(Embodiment 3)

Figure 5:
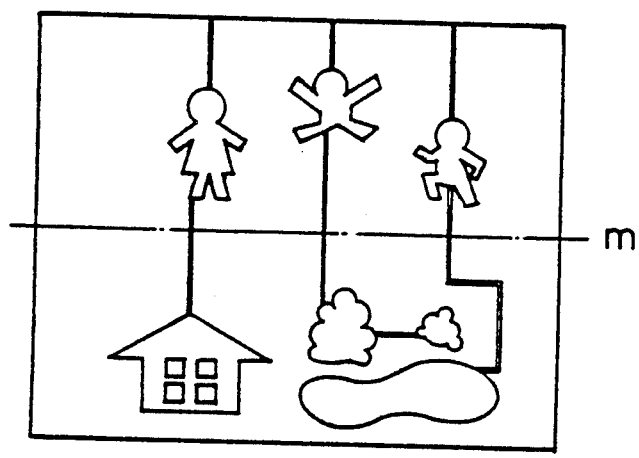

Two different transparent conductive film patterns were formed by short-circuiting patterns which were to be colored in the same color. Thereafter, color layers were formed in the same way as in Embodiment 1, and the substrate was cut along a line m in FIG. 5, to form two different multicolor surface members.

In this case, since the number of the power terminals for the electrodeposition can be the same as that used when manufacturing multicolor surface members of the same pattern, two different multicolor surface members could be produced simultaneously and more conveniently.

(Embodiment 4)

Figure 6:
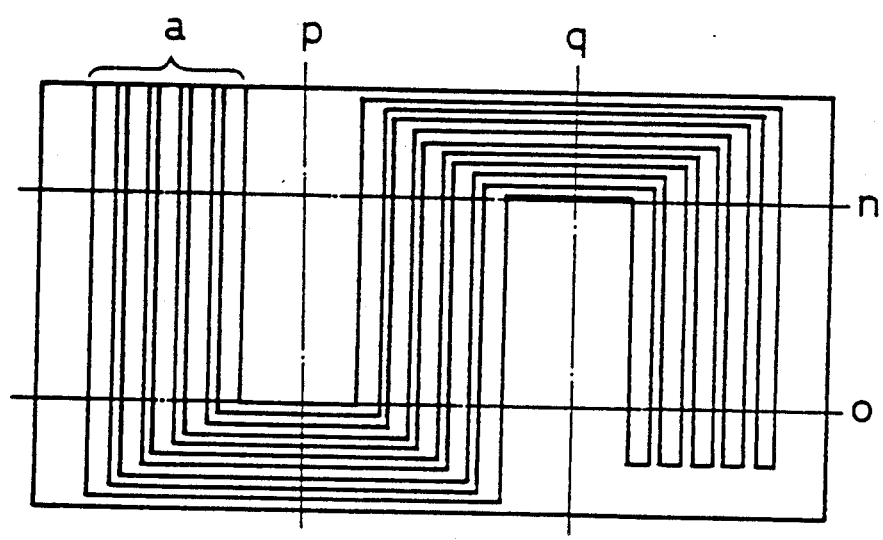

After the patterns of a transparent conductive film were formed as shown in FIG. 6, color layers were formed in the same way as in Embodiment 1 using a terminal a portion of the conductive film as a power terminal for the electrodeposition. The substrate was then cut along lines n, o, p and q, so that three multicolor surface members each of the same pattern were simultaneously produced. In this case, since the number of power terminals for the electrodeposition can be the same as that used when manufacturing multicolor surface members of a single pattern, the multicolor surface members with striped patterns could be produced more conveniently.

As described above, in a method of manufacturing a multicolor surface member by forming color layers by electrodeposition, the present invention pays specific attention to the fact that this method provides an extremely uniform color layer, irrespective of substrate size. Therefore the present invention enables the formation of a conductive layer for electrodeposition of a plurality of patterns on the same substrate, the simultaneous formation of color layers by electrodeposition, and then the cutting of the substrate. Accordingly a plurality of multicolor surface members can be produced by a single manufacture process, and hence a large improvement in the producibility and the reduction of the cost of production can be obtained. The application of the present invention to the provision of multicolor display elements, optical color separation means such as camera tubes, or the like is expected.

What is claimed is:

1. A method for manufacturing a color member comprising the steps of: forming a plurality of electrically conductive thin film patterns on an electrically insulative substrate; simultaneously forming a colored layer on said conductive thin films of all of the patterns by simultaneously applying a voltage to the conductive films of all the patterns to simultaneously electrodeposit a coloring material and polymer on said conductive thin films; and cutting the substrate having the colored layer thereon into plural sections each having one of the given patterns.

2. A method for manufacturing a color member as claimed in claim 1, wherein each of the colored layers is composed of a mixture of an electrodeposition polymer and a coloring material which are electrolytically deposited from a solution containing the electrodeposition polymer and the coloring material.

3. A method for manufacturing a color member as claimed in claim 1, wherein the conductive thin film is made of $SnO_2$.

4. A method for manufacturing a color member as claimed in claim 1, wherein the plurality of electrically conductive thin film patterns on the substrate are the same.

5. A method for manufacturing a color member as claimed in claim 1, wherein the plurality of electrically conductive thin film patterns on the substrate are different.

6. A method for manufacturing a color member as claimed in claim 1, wherein each of the given plural patterns on the substrate comprises a stripe pattern.

7. A method for manufacturing a color member as claimed in claim 1, wherein at least one of the plurality of electrically conductive thin film patterns on the substrate has a wave form stripe pattern.

8. A method for manufacturing a color member as claimed in claim 1, wherein the color member comprises a color filter.

9. A method for manufacturing a multicolor member comprising the steps of: forming given plural patterns each having plural conductive thin films electrically insulated from each other on a substrate; forming colored layers of different colors on different ones of the conductive films in each of the plural patterns by simultaneously applying a voltage to all of the conductive films in each pattern which are to be colored the same color to simultaneously electrodeposit thereon a coloring material of one color and polymer and repeating the simultaneously applying step using other conductive films in each pattern and coloring materials of other colors; and cutting the substrate having the colored layers thereon into plural sections each having one of the given patterns.

10. A method for manufacturing a color member as claimed in claim 9, wherein each of the colored layers is composed of a mixture of an electrodeposition polymer and a coloring material which are electrolytically deposited from a solution containing the electrodeposition polymer and the coloring material.

11. A method for manufacturing a color member as claimed in claim 10, in which said coloring material is water-insoluble.

12. A method for manufacturing a color member as claimed in claim 10, in which said coloring material comprises a dye.

13. A method for manufacturing a color member as claimed in claim 10, wherein the electrodeposition polymer comprises a negatively charged polymer.

14. A method for manufacturing a color member as claimed in claim 9, wherein the conductive thin film is made of $SnO_2$.

15. A method for manufacturing a color member as claimed in claim 9, wherein the given plural patterns on the substrate are the same.

16. A method for manufacturing a color member as claimed in claim 9, wherein the given plural patterns on the substrate are different.

17. A method for manufacturing a color member as claimed in claim 9, wherein each of the given plural patterns on the substrate comprises a stripe pattern.

18. A method for manufacturing a color member as claimed in claim 9, wherein at least one of the given plural patterns on the substrate has a wave form stripe pattern.

19. A method for manufacturing a color member as claimed in claim 9, wherein the color member comprises a color filter.

20. A method for manufacturing a color member as claimed in claim 19, wherein the color filter compresses a color filter for a display device.

21. A method of manufacturing color members comprising the steps of: forming a plurality of electrically conductive film patterns on different sections of a common electrically insulative substrate, each pattern corresponding to one color member; simultaneously forming a colored layer on the conductive films of all the patterns by simultaneously applying a voltage to the conductive films of all the patterns to simultaneously electrodeposit a coloring material and polymer on the conductive films; and thereafter cutting the common substrate into different sections each having thereon one of the given patterns to thereby form a plurality of individual color members.

22. A method of manufacturing multicolor members comprising the steps of: forming on a common electrically insulative substrate a plurality of given patterns each comprised of plural electrically conductive films electrically insulated from one another on the common substrate, each given pattern corresponding to one multicolor member; simultaneously forming a colored layer of one color tone on some of the conductive films in each given pattern by simultaneously applying a voltage to said some conductive films in each pattern to simultaneously electrodeposit thereon a coloring material of the one color tone and polymer; successively repeating the simultaneously forming step using coloring materials of different color tones on others of the conductive films in each given pattern; and thereafter cutting the common substrate into different sections each having thereon one of the given patterns to thereby form a plurality of individual multicolor members.

23. A method according to claim 22; wherein the step of forming a plurality of given patterns comprises forming a plurality of given patterns all of which are the same.

24. A method according to claim 22; wherein the step of forming a plurality of given patterns comprises forming a plurality of given patterns at least some of which are different than the others.

25. A method according to claim 24; wherein the simultaneously forming steps comprise electrically connecting the conductive films in each pattern which are to be colored the same color tone to a source of voltage to simultaneously form by electrodeposition a colored layer of one color tone on the electrically connected conductive films, and successively repeating the electrically connecting step using other conductive films in each pattern to simultaneously form thereon colored layers of other color tones.

* * * * *